US006973820B2

(12) United States Patent
Watarai et al.

(10) Patent No.: US 6,973,820 B2
(45) Date of Patent: Dec. 13, 2005

(54) COMBUSTION PRESSURE SENSOR DESIGNED TO ENSURE STABILITY OF OUTPUT CHARACTERISTIC AND SENSITIVITY

(75) Inventors: Takehiro Watarai, Kuwana (JP); Fuminori Nakashima, Yokkaichi (JP); Hiromi Hiramatsu, Kariya (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/865,956

(22) Filed: Jun. 14, 2004

(65) Prior Publication Data
US 2004/0261502 A1 Dec. 30, 2004

(30) Foreign Application Priority Data

| Jun. 12, 2003 | (JP) | ............................. 2003-167868 |
| Jun. 12, 2003 | (JP) | ............................. 2003-167869 |
| Mar. 16, 2004 | (JP) | ............................. 2004-074761 |

(51) Int. Cl.[7] ......................................... G01L 23/22
(52) U.S. Cl. ................................................ 73/35.13
(58) Field of Search ........................... 73/115, 35.07, 73/35.13

(56) References Cited

U.S. PATENT DOCUMENTS

| 3,336,555 A | * | 8/1967 | Pastan ............................ 338/4 |
| 4,382,377 A | * | 5/1983 | Kleinschmidt et al. ..... 73/35.13 |
| 4,392,082 A | * | 7/1983 | Harada .......................... 315/55 |
| 4,430,899 A | * | 2/1984 | Wessel .......................... 73/754 |
| 4,586,018 A | * | 4/1986 | Bettman ....................... 338/42 |
| 4,712,036 A | * | 12/1987 | Gurich ......................... 310/333 |
| 4,712,082 A | * | 12/1987 | Ito et al. .......................... 338/4 |
| 4,840,067 A | * | 6/1989 | Nishida et al. ................ 73/726 |
| 4,920,805 A | * | 5/1990 | Yajima et al. ................. 73/706 |
| 4,939,497 A | * | 7/1990 | Nishida et al. ................. 338/4 |
| 5,726,351 A | * | 3/1998 | Glaser ........................... 73/115 |
| 5,777,239 A | * | 7/1998 | Fuglewicz ................ 73/862.68 |
| 5,852,245 A | * | 12/1998 | Wesling et al. ................ 73/723 |
| 6,411,038 B2 | * | 6/2002 | Murai et al. ................... 315/55 |
| 6,439,030 B2 | * | 8/2002 | Suzuki et al. .............. 73/35.13 |
| 6,539,787 B1 | * | 4/2003 | Murai et al. .............. 73/119 R |
| 6,575,039 B2 | * | 6/2003 | Murai et al. ................... 73/756 |
| 6,732,589 B2 | * | 5/2004 | Eickhoff et al. .............. 73/715 |

FOREIGN PATENT DOCUMENTS

JP    2002-327919    11/2002

OTHER PUBLICATIONS

Sellnau et al., Cylinder pressure based engine control using pressure ration management and low-cost non-intrusive cyldinder pressure sensors, SAE Int., 2000-10-0932. ppg 1-20.*

* cited by examiner

Primary Examiner—Hezron Williams
Assistant Examiner—John Fitzgerald
(74) Attorney, Agent, or Firm—Nixon & Vanderhye PC

(57) ABSTRACT

A combustion pressure sensor for an internal combustion engine is provided. The sensor includes a sensing element such as a piezoelectric device sensitive to a physical load applied thereto to produce an electric signal indicative thereof and a bendable member. The bendable member is bent upon application of the combustion pressure in the engine to apply the physical load to the sensing element. Specifically, the physical load is applied to the sensing element which arises from the bend deformation of the bendable member, thus eliminating the need for a complete surface-to-surface contact between the sensing element and the bendable member. This results in a decreased unit-to-unit variation in sensitivity of combustion pressure sensors and ensures the stability of output characteristics of the combustion pressure sensor.

14 Claims, 16 Drawing Sheets

COMBUSTION PRESSURE SENSOR DESIGNED TO ENSURE STABILITY OF OUTPUT CHARACTERISTIC AND SENSITIVITY

BACKGROUND OF THE INVENTION

1. Technical Field of the Invention

The present invention relates generally to an improved structure of a combustion pressure sensor for measuring the combustion pressure of an internal combustion engine, and more particularly to such a combustion pressure sensor designed to ensure the stability of output characteristics and sensitivity thereof.

2. Background Art

FIG. 19 shows one of typical combustion pressure sensors, as taught in Japanese Patent First Publication No. 2002-327919.

The combustion pressure sensor consists of a hollow cylindrical housing 10, a load detector 12, and a center shaft 111. The housing 10 is installed in a cylinder head of an internal combustion engine. The load detector 12 is sensitive to a physical pressure load to produce an electric signal indicative thereof. The center shaft 111 is disposed within the housing 10 and works to transmit the combustion pressure in the combustion chamber of the engine to the load detector 12.

The load detector 12 includes a laminate of piezoelectric elements 122 and electrodes 129. The laminate is pressed by a nut 119 screwed on the center shaft 111 to apply a preload to the piezoelectric elements 122. When the compressive pressure acting on the piezoelectric elements 122 changes with a change in pressure within the combustion chamber of the engine, it will cause the piezoelectric elements 122 to produce an electric signal in the form of voltage as a function of the change in the compressive pressure.

Improving the efficiency of transmitting the load to the piezoelectric elements 122 is effective in decreasing a unit-to-unit variation in sensitivity of combustion pressure sensors or stabilizing output characteristics of each combustion pressure sensor. To this end, it is required for combustion pressure sensors of the above type to ensure complete surface-to-surface contacts between the piezoelectric elements 122 and the electrodes 129. Particularly, it is important to achieve complete contacts between the entire surfaces (will also be referred to as pressure-applied surfaces below) of the piezoelectric elements 122 and surfaces of parts nipping the piezoelectric elements 122 therebetween. This requires application of a great preload to the piezoelectric elements 122 and the nipping parts. The inventors of this application performed tests on the above type of combustion pressure sensors and found that a preload of approximately 3000N is required for decreasing the unit-to-unit variation in sensitivity of the combustion pressure sensors or stabilizing output characteristics of the combustion pressure sensors.

The application of a preload of as much as 3000N, however, results in breakage of the center shaft 111, etc. or physical damage to joints in the sensor.

The surface-to-surface contacts between the piezoelectric elements 122 and the electrodes 129 may alternatively be achieved by increasing the flatness or parallelism of the surfaces of the piezoelectric elements 122 and the electrodes 129. This requires a high degree of machining accuracy, thus resulting in increased production costs of the combustion pressure sensors.

SUMMARY OF THE INVENTION

It is therefore a principal object of the invention to avoid the disadvantages of the prior art.

It is another object of the invention to provide a combustion pressure sensor designed to minimize a unit-to-unit variation in sensitivity of combustion pressure sensors and ensure the stability of output characteristics thereof.

According to one aspect of the invention, there is provided a combustion pressure sensor working to measure the combustion pressure within a combustion chamber of an internal combustion engine. The combustion pressure sensor comprises: (a) a sensing element sensitive to a physical load applied thereto to produce a signal as a function of the applied load; and (b) a bendable member placed in abutment with the sensing element. The bendable member is bent upon application of the combustion pressure in the internal combustion engine to apply the physical load to the sensing element.

Specifically, the combustion pressure sensor is designed to apply the physical load to the sensing element which arises from the bend deformation of the bendable member, thus eliminating the need for a surface-to-surface contact between the sensing element and the bendable member. This results in a decreased unit-to-unit variation in sensitivity of combustion pressure sensors and ensures the stability of output characteristics of the combustion pressure sensor.

In the preferred mode of the invention, the sensing element and the bendable member may be disposed within a spark plug equipped with a center electrode and a ground electrode which defines a spark gap between itself and the center electrode for producing sparks to ignite a mixture in the internal combustion engine.

The sensing element may be implemented by a piezoelectric device or a strain gauge.

The piezoelectric device works to produce a charge as a function of the physical load applied thereto. The combustion pressure sensor may also include a voltage converter working to convert the charge produced by the piezoelectric device into a voltage signal.

The combustion pressure sensor may also include a voltage adjuster working to adjust a level of the voltage signal provided by the voltage converter in order to increase a signal-to-noise (S/N) ratio. Piezoelectric devices, as used in measuring the combustion pressure of automotive engines, are usually designed to produce a charge of several pc to several hundreds pc per applied pressure of 1 Mpa. The charge is, thus, exposed to electric noises arising from accessories or a radio set during transmission to an engine ECU. Additionally, due to a variation in parts dimension or assembling errors, typical combustion pressure sensors have the problem that sensor outputs differ from each other when a combustion pressure is 1 Mpa. This results in complex engine control or decreased accuracy of the engine control or requires an additional sensor for correcting an output of the combustion pressure sensors, thus lading to increased production costs of the combustion pressure sensors.

The use of the voltage adjuster alleviates the above problem.

The combustion pressure sensor may further include a heating member which is supplied with an electric power to heat air within the combustion chamber of the engine.

According to the second aspect of the invention, there is provided a method for adjusting an output of a pressure combustion sensor which includes a piezoelectric device sensitive to a physical load arising from a combustion pressure in a combustion chamber of an internal combustion engine to produce a charge as a function of the physical load, a voltage converter working to convert the charge produced by the piezoelectric device into a voltage signal, and a voltage adjuster working to adjust a level of the voltage signal provided by the voltage converter. The method comprises: applying a physical load equivalent to the combustion pressure to the pressure combustion sensor; monitoring an output of the voltage adjuster; and adjusting a circuit constant of the voltage adjuster so as to bring the monitored output of the voltage adjuster into agreement with a desired one. This results in an increased signal-to-noise ratio of the output of the piezoelectric device.

In the preferred mode of the invention, the voltage adjuster may be equipped with a resistor. The adjusting step may trim the resistor to adjust the circuit constant of the voltage adjuster.

The adjusting step may alternatively select one of resistors having different resistance values and replaces the selected one with the resistor installed in the voltage adjuster to adjust the circuit constant of the voltage adjuster.

According to the third aspect of the invention, there is provided a method for adjusting an output of a pressure combustion sensor which includes a piezoelectric device sensitive to a physical load arising from a combustion pressure in a combustion chamber of an internal combustion engine to produce a charge as a function of the physical load, and a voltage converter working to convert the charge produced by the piezoelectric device into a voltage signal. The method comprises: applying a physical load equivalent to the combustion pressure to the pressure combustion sensor; monitoring an output of the voltage converter; and adjusting a circuit constant of the voltage converter so as to bring the monitored output of the voltage adjuster into agreement with a desired one.

In the preferred mode of the invention, the voltage converter may be equipped with a capacitor. The adjusting step may select one of capacitors having different capacitances and replaces the selected one with the capacitor installed in the voltage converter to adjust the circuit constant of the voltage converter.

According to the fourth aspect of the invention, there is provided a combustion pressure sensor for an internal combustion engine which comprises: (a) a hollow cylindrical housing having a length, the housing being designed to have a combustion chamber side end facing a combustion chamber of an internal combustion engine; (b) a load detector including a bendable member and a sensing element, the bendable member being subjected to a bend deformation upon application of a physical load applied thereto, the sensing element being placed in abutment with the bendable member so as to undergo a bend deformation following the bend deformation of the bendable member to produce a signal as a function of the physical load applied to the bendable member; and (c) a load transmitting member disposed within the housing. The load transmitting member has a length with an end portion extending outside the combustion chamber side end of the housing. The load transmitting member works to transmit a combustion pressure within the combustion chamber of the engine to the bendable member of the load detector as the physical load.

In the preferred mode of the invention, the bendable member may be made of a plate which includes an inner and an outer portion. The outer portion has a periphery secured on the housing. The inner portion is applied with the physical load transmitted through the load transmitting member. The sensing element is disposed between the outer and inner portions of the bendable member.

The bendable member has a chamber within which the sensing element is disposed. The load detector also includes a metallic cover joined to the bendable member to hermetically seal the chamber.

The load transmitting member has installed therein a heating element which is supplied with an electric power to produce heat.

The sensing element and the bendable member are disposed within a spark plug equipped with a center electrode and a ground electrode which defines a spark gap between itself and the center electrode for producing sparks to ignite a mixture in the internal combustion engine.

The sensing element is implemented by a piezoelectric device or a strain gauge.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the Drawings.

DESCRIPTION OF THE PREFERRED EMBODIMENTS

Figure 1:
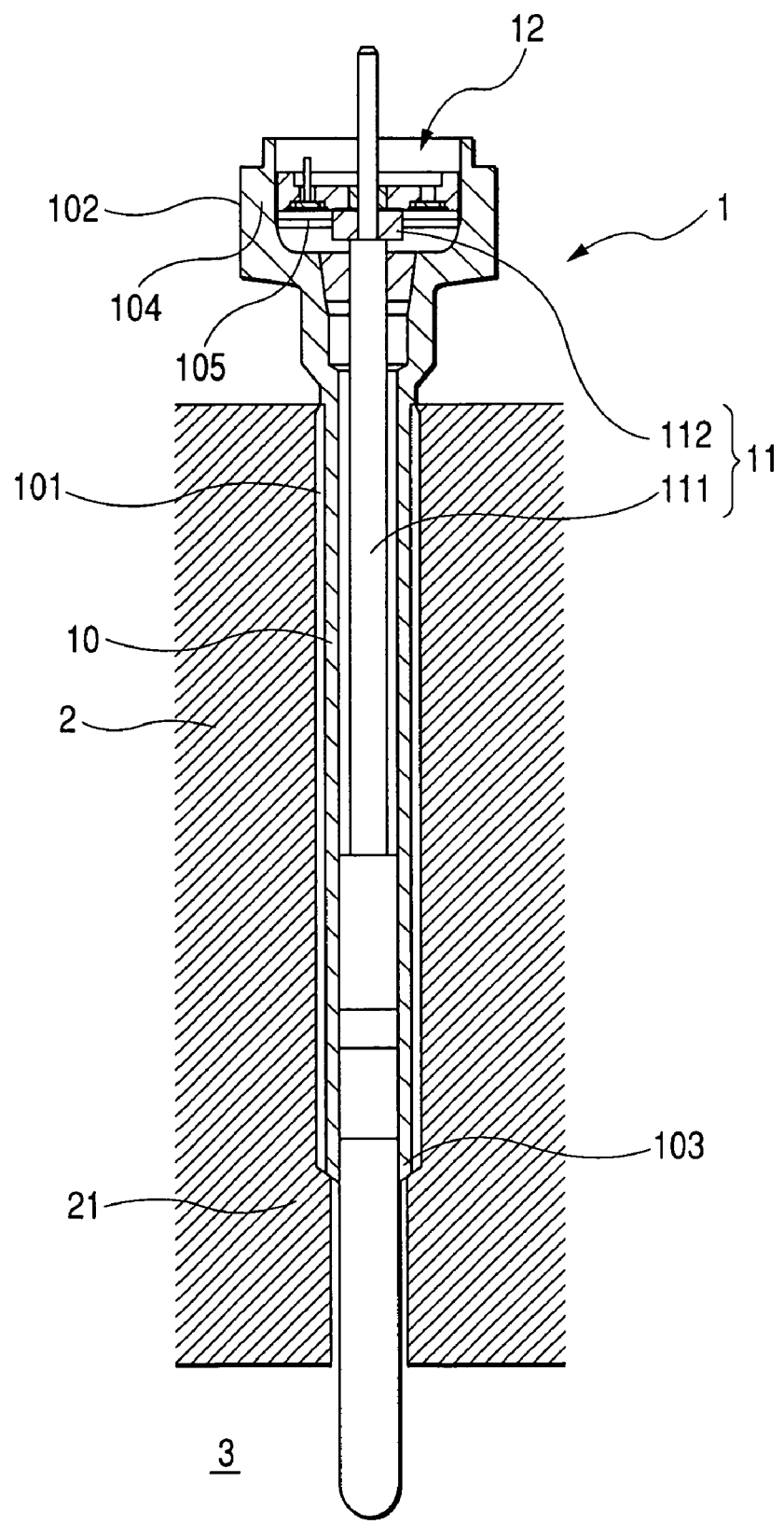
FIG. 1 is a longitudinal sectional view which shows a combustion pressure sensor according to the first embodiment of the invention which is mounted in a cylinder head of an internal combustion engine.
Figure 2:
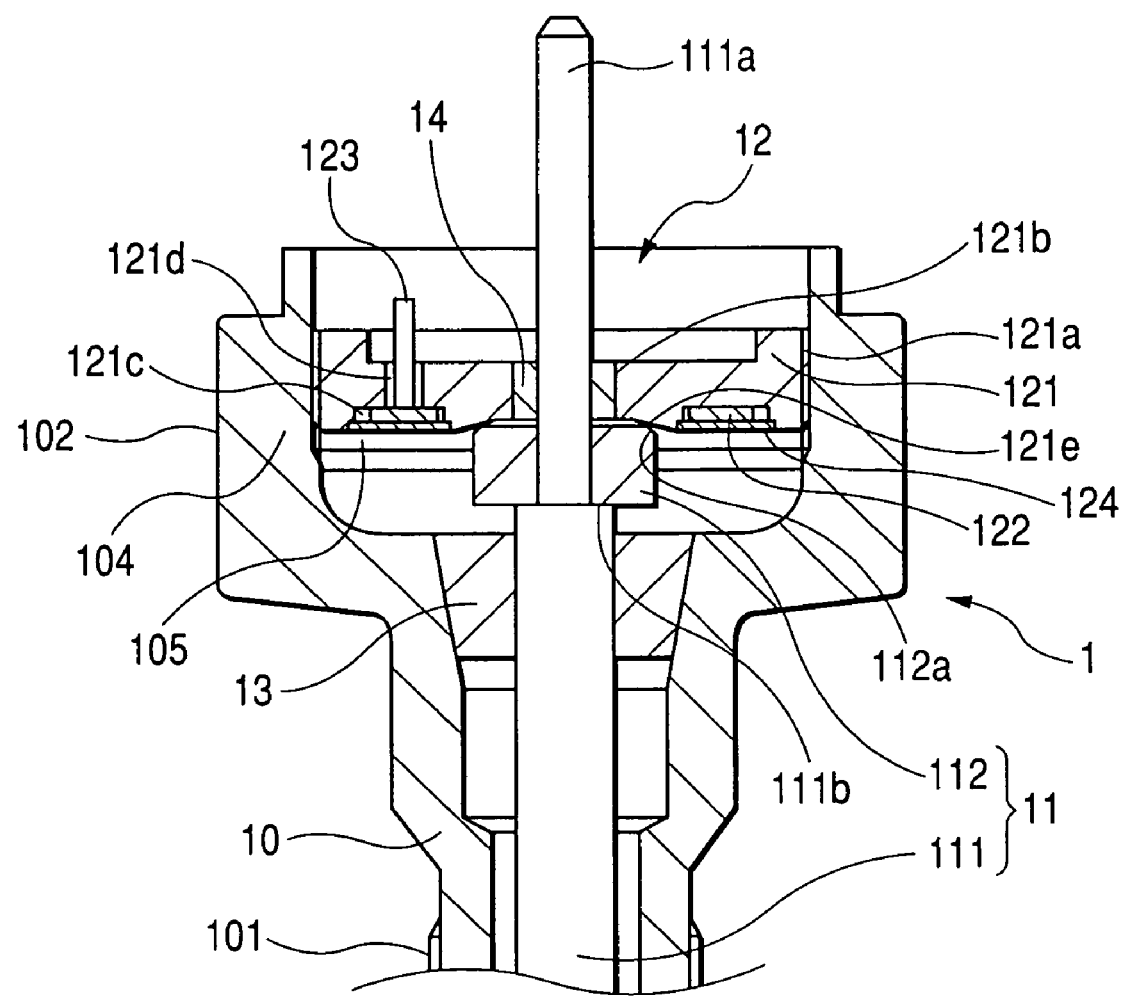
FIG. 2 is a partially enlarged view of FIG. 1.

Referring to the drawings, wherein like reference numbers refer to like parts in several views, particularly to FIGS. 1 and 2, there is shown a combustion pressure sensor 1 according to the invention which is, as an example, illustrated in FIG. 1 as being installed in a cylinder head 2 of an automotive internal combustion engine (e.g., a diesel engine) to measure the combustion pressure in a combustion chamber 3.

The combustion pressure sensor 1 includes a hollow cylindrical metallic housing 10 fitted in the cylinder head 2, a load transmitting assembly 11, and a load detector 12. The load transmitting assembly 12 works to transmit a physical pressure load (i.e., combustion pressure) arising from the combustion of the engine to the load detector 12.

The housing 10 has an external thread 101 formed on the circumference thereof and a hexagon head 102. Installation of the housing 10 in the cylinder head 2 is achieved by turning the hexagon head 102 to bring the external thread 101 into firm engagement with an internal thread (not shown) formed in a mount hole of the cylinder head 2. The housing 10 has a top portion (i.e., a lower portion, as viewed in FIG. 1) oriented toward the combustion chamber 3 and a base portion (i.e., an upper portion, as viewed in FIG. 1) extending outside the cylinder head 2. The top portion of the housing 10 has a tip 103 urged elastically into abutment with a seat 21 (i.e., an annular tapered surface) formed on an inner wall of the mount hole of the cylinder head 2, thereby hermetically closing or sealing the combustion chamber 3. The base portion of the housing 10 has a large-diameter cylindrical head 104 within which the load detector 12 is disposed. The cylinder 104 has an internal thread 105 formed in an inner wall thereof.

The load transmitting assembly 11 is made up of a center shaft 111 made of a metallic cylinder and an annular piston 112 made of metal or ceramic. The center shaft 111 has an end exposed to the combustion chamber 3 and the other end extending through the load detector 12 outside the cylindrical head 104 of the housing 10. The piston 112 is, as clearly shown in FIG. 2, fitted on a pin 111a of the center shaft 111 in constant abutment with a shoulder 111b. The piston 112 has a chamfered round corner 112a facing the load detector 12.

The load detector 12 is, as shown in FIG. 2, made up of an bendable member 121, a piezoelectric device 122, an output terminal 123, and a cover 124. The bendable member 121 is subjected to a bend deformation upon application of a physical load transmitted from the load transmitting assembly 11. The piezoelectric device 122 works to produce an electric signal as a function of the degree of the bend deformation of the bendable member 121, that is, the load applied to the bendable member 121 and outputs it through the output terminal 123. The cover 124 is fitted in the bendable member 121 to cover the piezoelectric device 122 air-tightly.

The bendable member 121 is implemented by a disc plate made of metal such as JIS SUS303 and has formed on a circumference thereof an external thread 121a which engages the internal thread 105 of the housing 10. The bendable member 121 also has a bore 121b, an annular groove 121c, and a terminal hole 121d. The bore 121b is formed in the center of the bendable member 121. The pin 111a of the center shaft 111 passes through the bore 121b. The annular groove 121c is formed in one of surfaces of the bendable member 121 facing the piston 112 and has the piezoelectric device 122 disposed therein. The terminal hole 121d extends in a thickness-wise direction of the bendable member 121 and opens into the annular groove 12c. The output terminal 123 extends through the terminal hole 121d.

The surface of the bendable member 121 facing the piston 112 (i.e., the lower surface as viewed in FIG. 2) has a conical or tapered wall 121e which makes substantially a line-to-line contact with the round corner 112a of the piston 112. The physical load arising from the combustion pressure in the internal combustion engine is transmitted to the bendable member 121 through the line-to-line contact between the tapered wall 121e and the round corner 112a of the piston 112 to apply bending moment to the bendable member 121.

The piezoelectric device 122 is formed by a ring-shaped thin plate made of a piezoelectric ceramic or a piezoelectric crystal. The piezoelectric device 122 is placed within the annular groove 121c of the bendable member 121 and bonded thereto so that it may be deformed following deformation of the bendable member 121 to produce an electric signal as a function of the physical load acting on the bendable member 121.

The output terminal 123 is connected electrically with an electrode formed on the piezoelectric device 122 through, for example, wire bonding to transmit the output of the piezoelectric device 122 to an external circuit (not shown). The output terminal 123 is retained by the bendable member 121 through an insulating material such as glass so that it is electrically insulated from the bendable member 121.

The cover 124 is made of a metal-made annular thin plate and welded at the whole of circumference thereof to the bendable member 121 to hermetically seal the groove 121c within which the piezoelectric device 122 is disposed.

A rubber ring 13 is disposed between the housing 10 and the center shaft 111. A rubber ring 14 is disposed between the bendable member 121 and the center shaft 111.

The bendable member 121 is urged against the piston 112 at a selected constant pressure level. This is achieved by adjusting the torque to fasten or screw the bendable member 121 into the housing 10 to a desired level and joint the bendable member 121 to the housing 10 through welding or a screw lock agent.

The piezoelectric device 122 may be replaced with a strain gauge.

In operation of the combustion pressure sensor 1, when an air-fuel mixture within the combustion chamber 3 is burnt, a resultant pressure acts on the center shaft 111. This will cause the center shaft 111 to be pressed against the bendable member 121 of the load detector 12 through the piston 112. Specifically, the combustion pressure within the combustion chamber 3 is transmitted to the bendable member 121 so that the bendable member 121 is exposed to the bending moment and bent or deformed, thus resulting in the stress or distortion in the bendable member 121. The piezoelectric device 122 undergoes such distortion and produces an electric signal proportional in level to the degree of the distortion, that is, as a function of the combustion pressure within the combustion chamber 3.

Specifically, the bendable member 121 is deformed by the physical load transmitted through the load transmitting assembly 11. The deformation of the bendable member 121 results in stress on the piezoelectric device 122 to produce an output as a function thereof (i.e., the combustion pressure within the combustion chamber 3). Specifically, the combustion pressure is transmitted to the piezoelectric device 122 through the deformation of the bendable member 121. This eliminates the need for applying a uniform great preload on the entire major surfaces of the piezoelectric device 122, as in the conventional structure illustrated in FIG. 13. The structure of the load detector 12 in this embodiment requires only a small preload to be applied to the bendable member 121 (i.e., the piezoelectric device 122), thus resulting in a decreased unit-to-unit variation in sensitivity of the load detector 12 and ensuring the stability of operation of the load detector 12. The inventors of this application have found experimentally that substantially the same performance of the load detector 12 as that of the conventional structure, as illustrated in FIG. 19, may be obtained by half a preload needed in the conventional structure.

Figure 19:
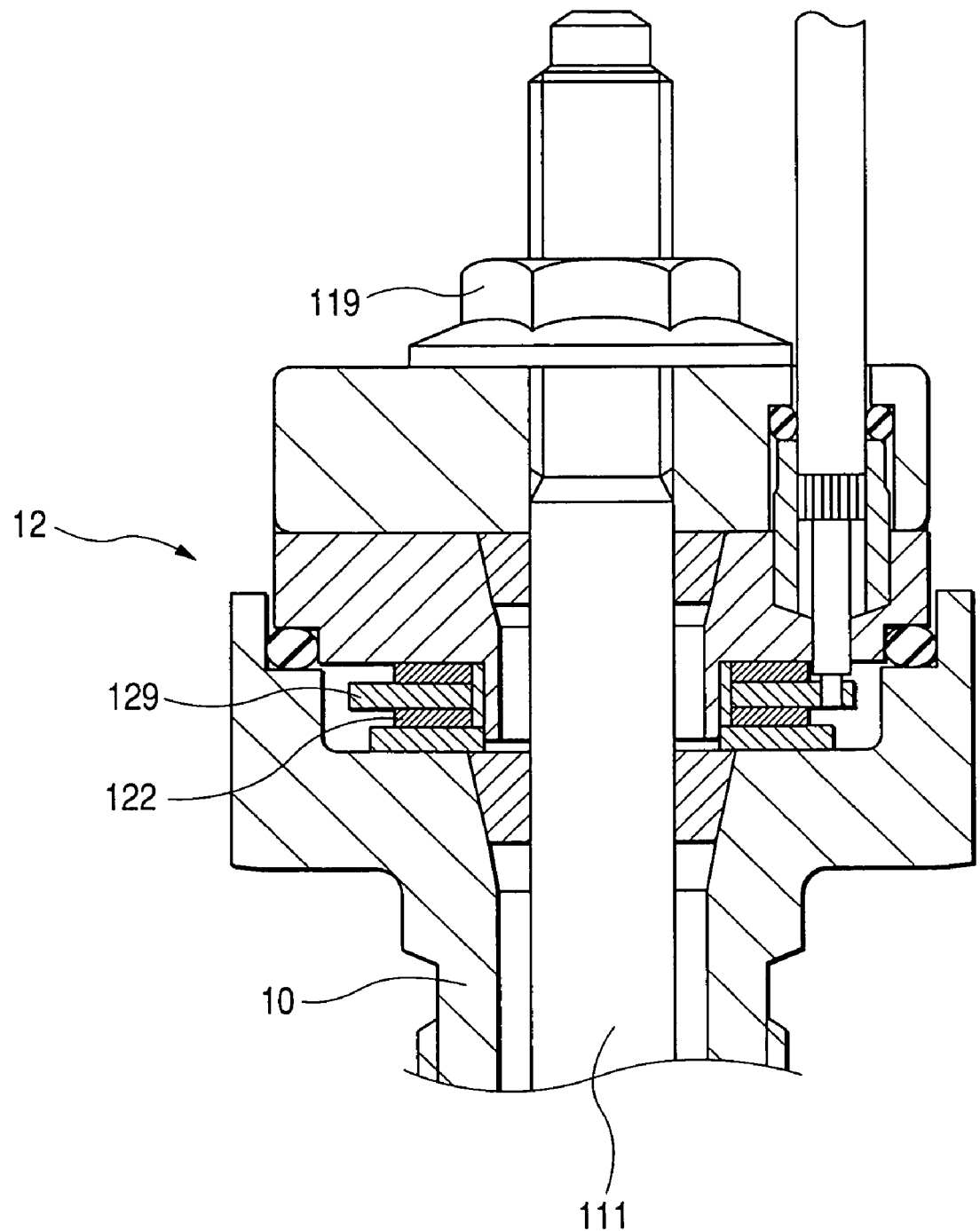
FIG. 19 is a partially enlarged view which shows a conventional combustion pressure sensor.

Combustion pressure sensors of the type, as illustrated in FIG. 19, in which a compressive force is exerted on the piezoelectric device usually need many component parts and are complex in structure. The component parts are also needed to be assembled or laid to overlap each other with high accuracy. The structure of the load detector 12 of this embodiment in which the piezoelectric device 122 is deformed following the deformation of the bendable member 121 permits the number of parts used to transmit the physical load to the load detector 12 to be decreased as compared with the conventional sensors and also permits the load detector 12 to be made as a compact unit for facilitating ease of installation in the housing 10.

The cover 124 used to seal the piezoelectric device 122 hermetically is, as described above, made of metal, thus resulting in no deterioration in sealing performance of the cover 124 arising from, for example, permanent set in fatigue of rubber O-rings.

Figure 3:
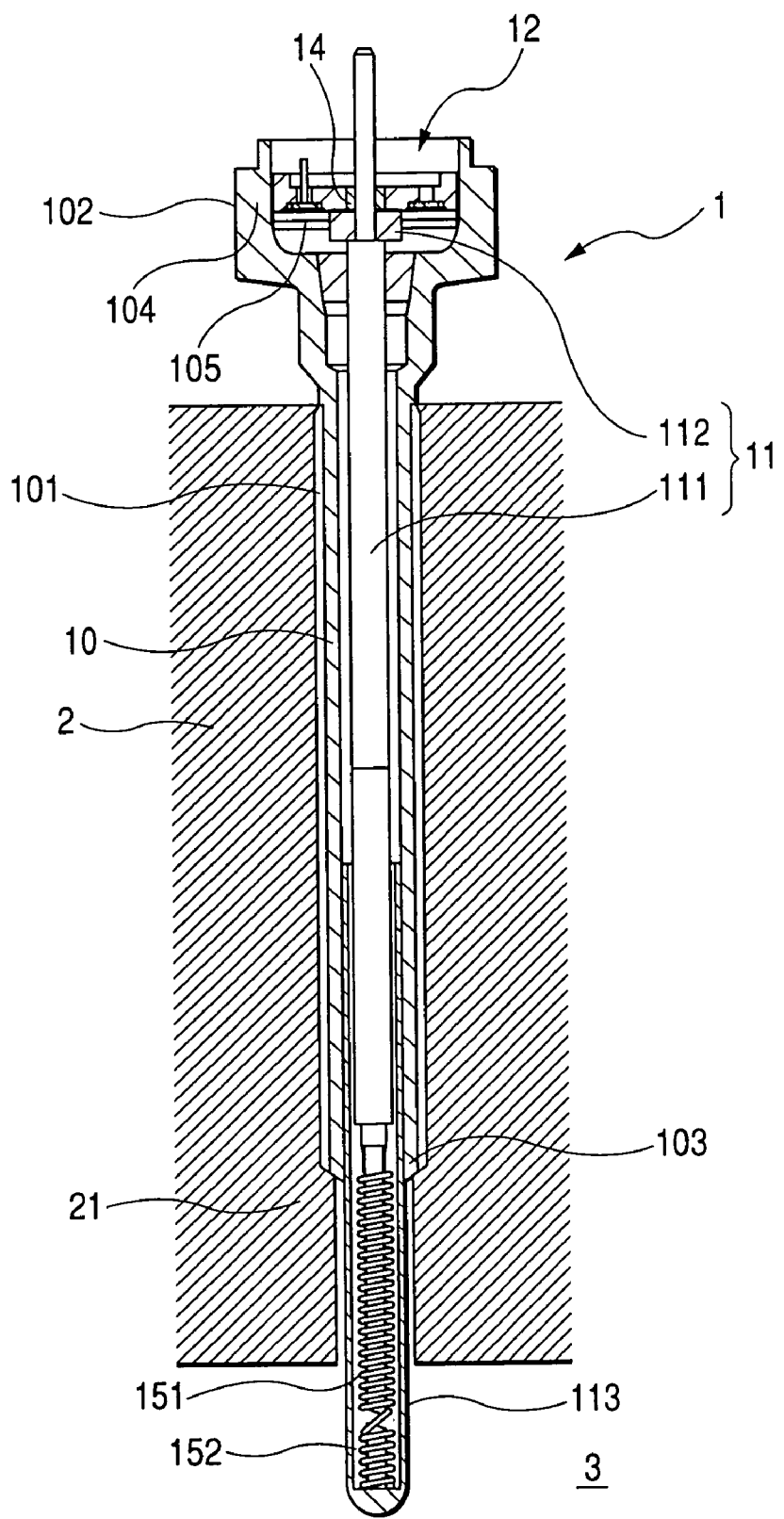
FIG. 3 is a longitudinal sectional view which shows a combustion pressure sensor according to the second embodiment of the invention which is mounted in a cylinder head of an internal combustion engine.

FIG. 3 shows the combustion pressure sensor 1 according to the second embodiment of the invention which is different from the first embodiment only in that it is equipped with a glow plug function. The same reference numbers as employed in FIGS. 1 and 2 will refer to the same or similar parts, and explanation thereof in detail will be omitted here.

The center shaft 111 has a hollow cylindrical sheath 113 fitted on the top end thereof facing the combustion chamber 3. Disposed in the sheath 113 is a heating coil 151 which is electrically energized to produce heat. The sheath 113 is filled with insulating powder 152 to insulate the heating coil 151 electrically from the sheath 113.

The heating coil 151 is electrically connectable at one end thereof to a plus terminal (+) of a dc power supply (not shown) through the center shaft 111 and at the other end to ground (i.e., the body of the vehicle) through the housing 10 and the cylinder head 2. The heating coil 151 works to heat the air within the combustion chamber 3.

The piston 112 is made of a highly insulating material such as ceramic and works together with the rubber ring 14 to establish a seal between the center shaft 111 and the bendable member 121.

The structure of the combustion pressure sensor 1 of this embodiment produces the same beneficial effects as those in the first embodiment.

Figure 4:
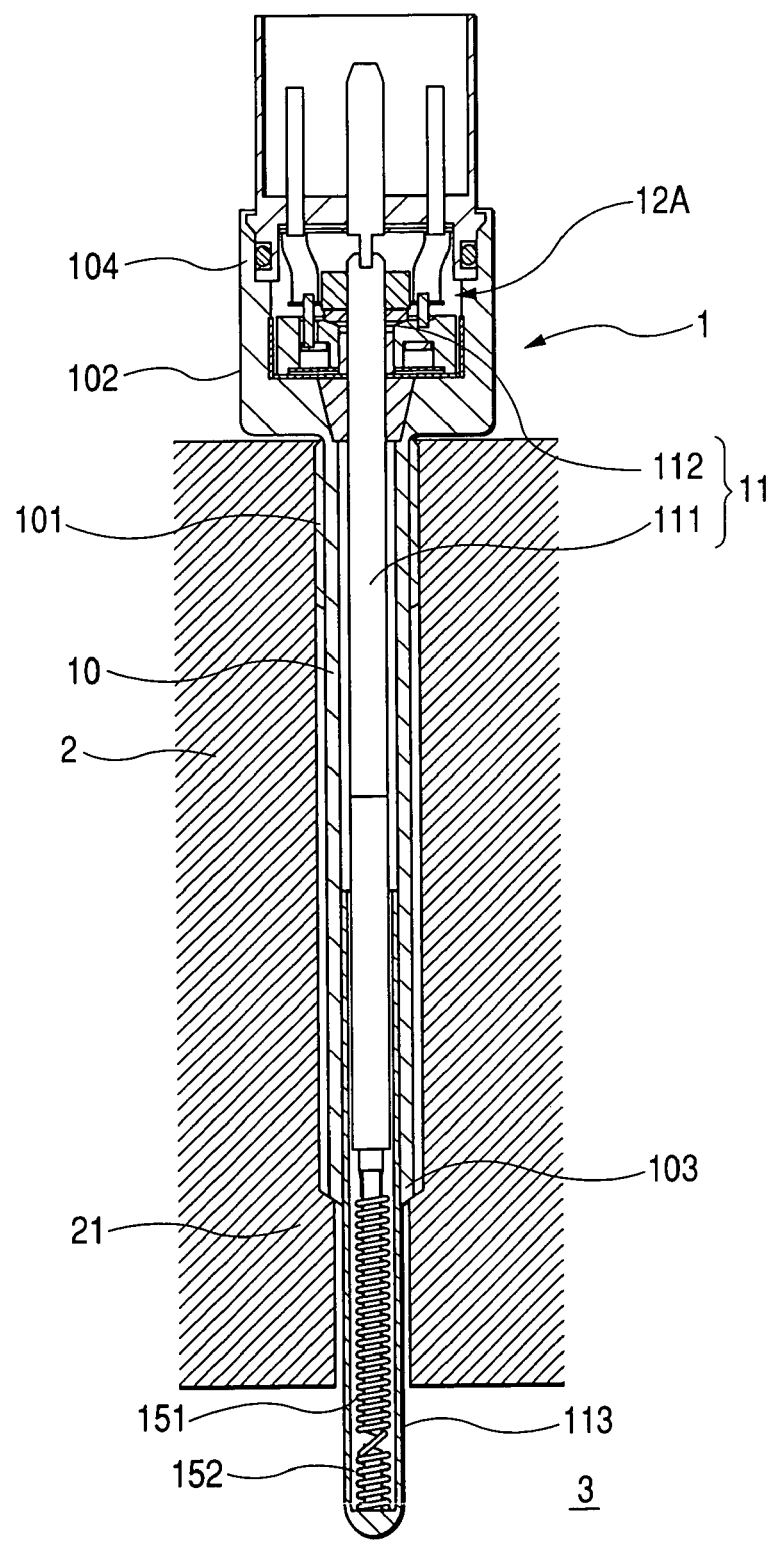
FIG. 4 is a longitudinal sectional view which shows a combustion pressure sensor according to the third embodiment of the invention which is mounted in a cylinder head of an internal combustion engine.
Figure 5:
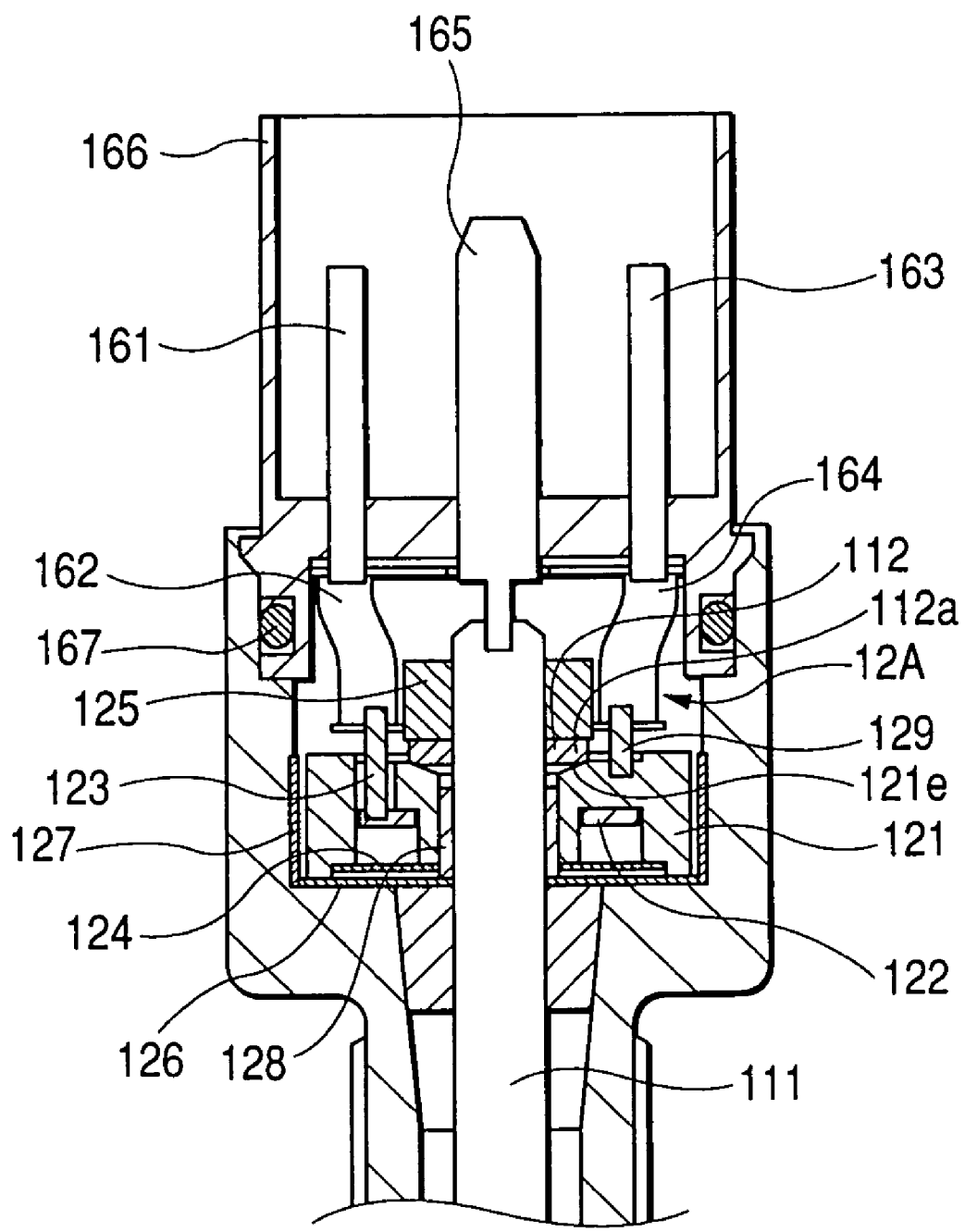
FIG. 5 is a partially enlarged view of FIG. 4.

FIGS. 4 and 5 show the combustion pressure sensor 1 according to the third embodiment of the invention which is different from the second embodiment in structure of a load detector 12A and mounting structure for the load detector 12A. The same reference numbers as employed in FIG. 3 will refer to the same or similar parts, and explanation thereof in detail will be omitted here.

The load detector 12A includes the bendable member 121 which does not have the external thread 121a, as used in the first and second embodiments. The bendable member 121 is attached firmly to the housing 10 and the center shaft 111 through a lock nut 125.

A resinous insulating sheet 126 is disposed on the bottom surface of the bendable member 121. A resinous insulating wall 127 is disposed around the circumference of the bendable member 121. This insulates the bendable member 121 electrically from the housing 10. Further, a rubber tube 128 is fitted on an inner wall of the bendable member 121 to insulate the bendable member 121 electrically from the center shaft 111. The structure of this embodiment serves to facilitate ease of electrical insulation of the bendable member 121 from the housing 10 as compared with the second embodiment in which the bendable member 121 is fitted within the housing 10 using the internal thread 121a.

The lock nut 125 and the piston 112 are located farther from the combustion chamber 3 than the bendable member 121. The bendable member 121 has the tapered wall 121e formed on a surface thereof opposite a surface facing the combustion chamber 3. The tapered wall 121e is in line-to-line contact with the round corner 112a of the piston 112. The piston 112 is made of alumina and works to insulate the bendable member 121 electrically from the center shaft 111.

The bendable member 121 is subjected to a selected preload and deformed at all times. This is achieved by tightening the lock nut 125 on the center shaft 111 with a selected torque to exert the preload on the bendable member 121 through the piston 112. The piezoelectric device 122 is, therefore, subjected to a selected degree of stress at all times. The lock nut 125 is fixed to the center shaft 111 through a lock agent. Instead of the lock nut 125, a sleeve may be press-fitted on the center shaft 111 to hold the bendable member 121 firmly.

The ground terminal 129 is joined to the bendable member 121. The output terminal 123 is connected mechanically to the bendable member 121 through a glass material so that it may be insulated electrically from the bendable member 121. The output terminal 123 is coupled to an electrode of the piezoelectric device 122 through wire bonding.

The output terminal 123 is connected electrically to a sensor signal output pin 161 through a covered conductor 162. The ground terminal 129 is connected electrically to a ground pin 163 through a covered conductor 164. The output terminal 123, the ground terminal 129, the output pin 161, and the ground pin 163 are all insulated electrically from the housing 10 and the center shaft 111. A power supply pin 165 is joined to the center shaft 111 to supply the electric power to the heating coil 151.

A hollow cylindrical casing 166 is press-fitted in an open end of the housing 10. An O-ring 167 is disposed within an annular groove formed in an outer circumferential surface of the casing 166 to establish an air-tight seal between inside and outside the housing 10. The installation of the casing 166 in the housing 10 may alternatively be achieved by welding or brazing.

In operation of the combustion pressure sensor 1, when a mixture within the combustion chamber 3 is burnt, a resultant pressure acts on the center shaft 111. This will cause the center shaft 111 and the piston 112 to be lifted upward, as viewed in FIG. 4, within the housing 10. Specifically, the center shaft 111 and the piston 112 are urged away from the combustion chamber 3, thereby reducing the degree of deformation of the bendable member 121, which results in a decreased stress on the piezoelectric device 122. The piezoelectric device 122 produces a voltage signal as a function of the decreased stress proportional to the combustion pressure within the combustion chamber 3.

The combustion pressure sensor 1 of this embodiment produces the same beneficial effects as those in the second embodiment.

Figure 6:
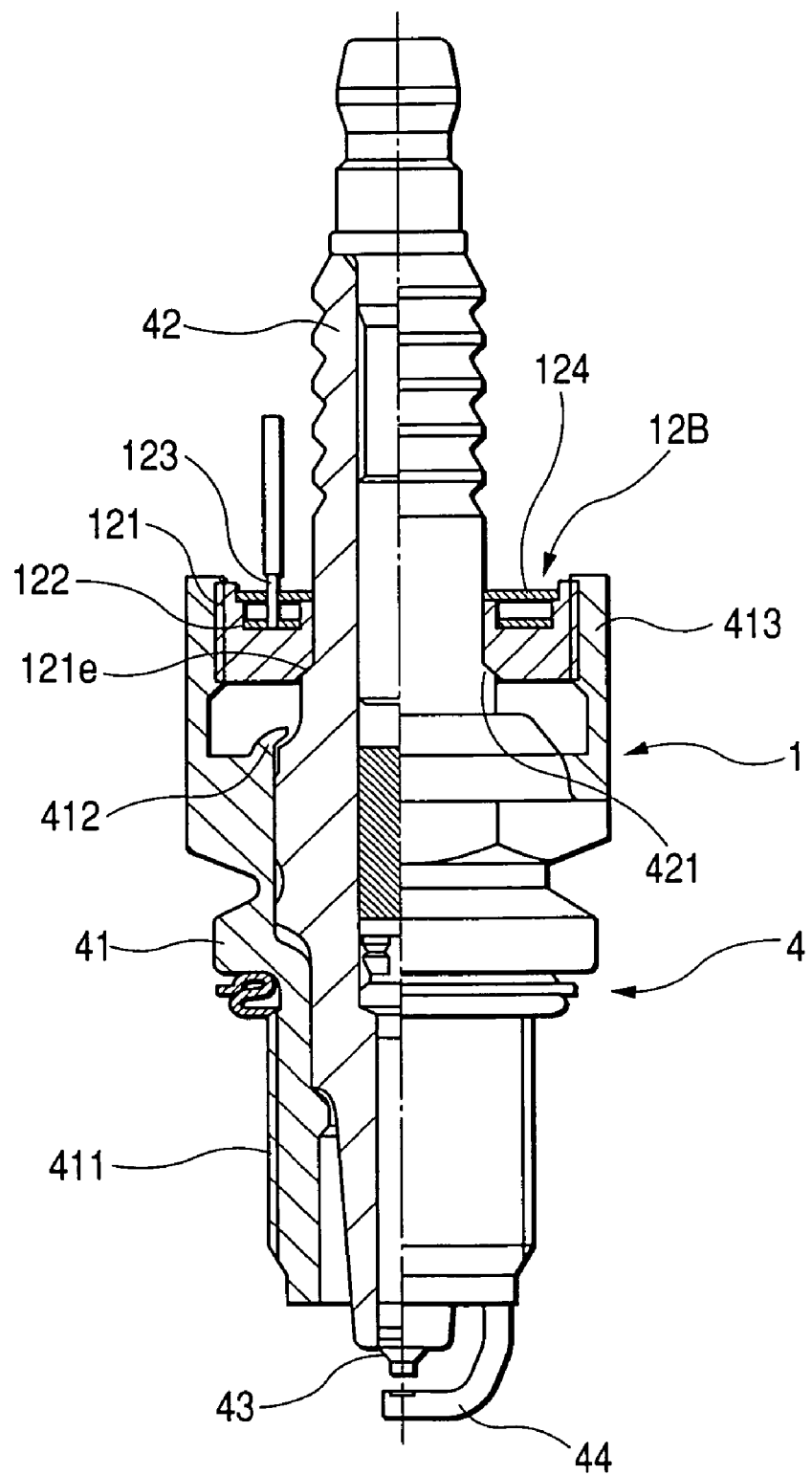
FIG. 6 is a longitudinal sectional view which shows a combustion pressure sensor according to the fourth embodiment of the invention which is mounted in a spark plug.

FIG. 6 shows the combustion pressure sensor 1 according to the fourth embodiment of the invention which is installed in a spark plug 4. The same reference numbers as employed in the first embodiment will refer to the same parts, and explanation thereof in detail will be omitted here.

The spark plug 4 includes a hollow cylindrical housing or metal shell 41 made of a conductive steel such as a low-carbon steel. The shell 41 has formed thereon an external thread 411 which engages an internal thread (not shown) formed in a mount hole of the cylinder head 2 for installation of the spark plug 4 in the cylinder head 2.

The shell 4 has a cylindrical porcelain 42 installed in a chamber thereof which is made of an alumina ceramic. The installation of the porcelain 42 is achieved by crimping an annular protrusion 412 formed on an end of the chamber. The porcelain 42 works as a load transmitting member for the combustion pressure sensor 1.

The porcelain 42 has a longitudinal center hole within which a cylindrical center electrode 43 installed. The center electrode 43 is insulated electrically from the shell 41. The center electrode 43 consists of a core portion made of a metallic material such as Cu having a higher thermal conductivity and an external portion made of a metallic material such as an Ni-based alloy having higher thermal and corrosion resistances. The center electrode 43 has a tip extending outside the end of the porcelain 42.

A ground electrode 44 is joined to the shell 41. The ground electrode 44 is made of an Ni-based alloy bar whose main component is nickel and welded directly to the end of the shell 41. A tip portion of the ground electrode 44 is bent at 90° to define a gap (usually called spark gap) between itself and the tip of the center electrode 43.

A large-diameter cylindrical wall 413 extends from an end of the metal shell 41 within which a load detector 12B is disposed. The cylindrical wall 413 has an internal thread formed on an inner side surface thereof. The load detector 12B has the bendable member 121 which has formed on an outer side surface an external thread which engages the internal thread of the cylindrical wall 413 for fixing the load detector 12B in the cylindrical wall 413. The bendable member 121 has a tapered surface 121e formed on an inner periphery thereof. The tapered surface 121e is urged by the engagement between the external and internal threads of the bendable member 121 and the shell 41 into constant abutment with an outer shoulder 421 of the porcelain 42.

The spark plug 4 is, as described above, installed in the cylinder head 2, as illustrated in FIG. 1, and works to produce a series of sparks between the center electrode 43 and the ground electrode 44 to ignite a mixture within the combustion chamber 3.

The combustion pressure developed within the combustion chamber 3 acts on and urges the porcelain 42 upward, as viewed in FIG. 6. This physical load on the porcelain 42 is transmitted to the bendable member 121 through a contact between the tapered surface 121e of the bendable member 121 and the shoulder 421 of the porcelain 42 to apply the bending moment to the bendable member 121, so that the bendable member 121 is deformed. This deformation results in the stress on the piezoelectric device 122 installed in the bendable member 121, thus producing an electrical signal as a function of the degree of the stress (i.e., the combustion pressure).

The combustion pressure sensor 1 of this embodiment produces the same beneficial effects as those in the first embodiment.

Figure 7:
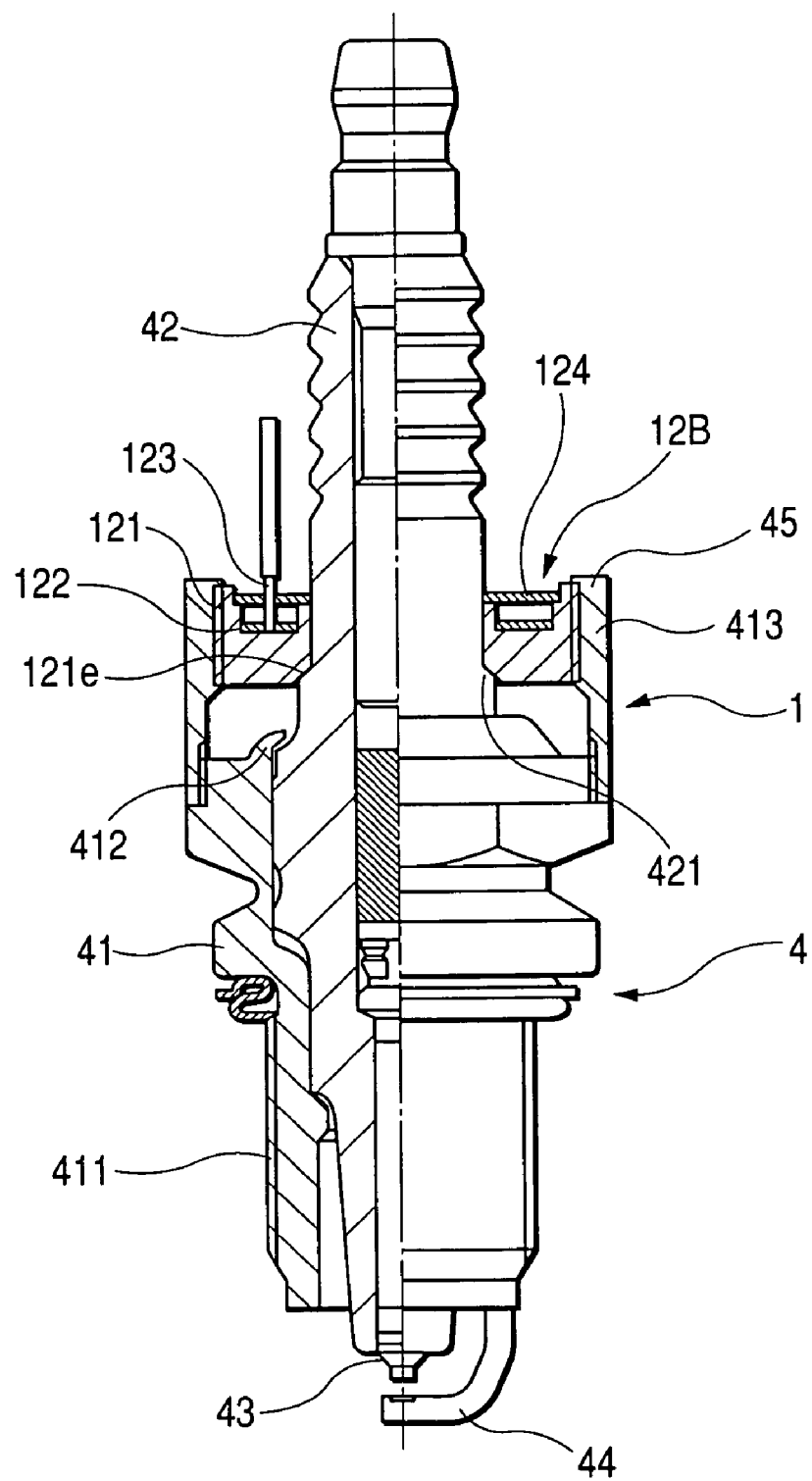
FIG. 7 is a longitudinal sectional view which shows a combustion pressure sensor according to the fifth embodiment of the invention which is mounted in a spark plug.

FIG. 7 shows the combustion pressure sensor 1 according to the fifth embodiment of the invention which is a modification of the fourth embodiment, as illustrated in FIG. 6. The spark plug 4 of this embodiment is different in structure of the shell 41 from that of the fourth embodiment. The same reference numbers as employed in the fourth embodiment will refer to the same parts, and explanation thereof in detail will be omitted here.

A hollow cylindrical separate casing 45 is, unlike the fourth embodiment, installed on the metal shell 41. Specifically, the casing 45 is screwed on the metal shell 41 to define a chamber within which the load detector 12B is disposed firmly. The use of the separate casing 45 results in simplicity of geometry of the metal shell 41, thus facilitating ease of machining of the metal shell 41 and crimping of the annular protrusion 412 to hold the porcelain 42 within the metal shell 41 before the casing 45 is installed on the metal shell 41.

Figure 8:
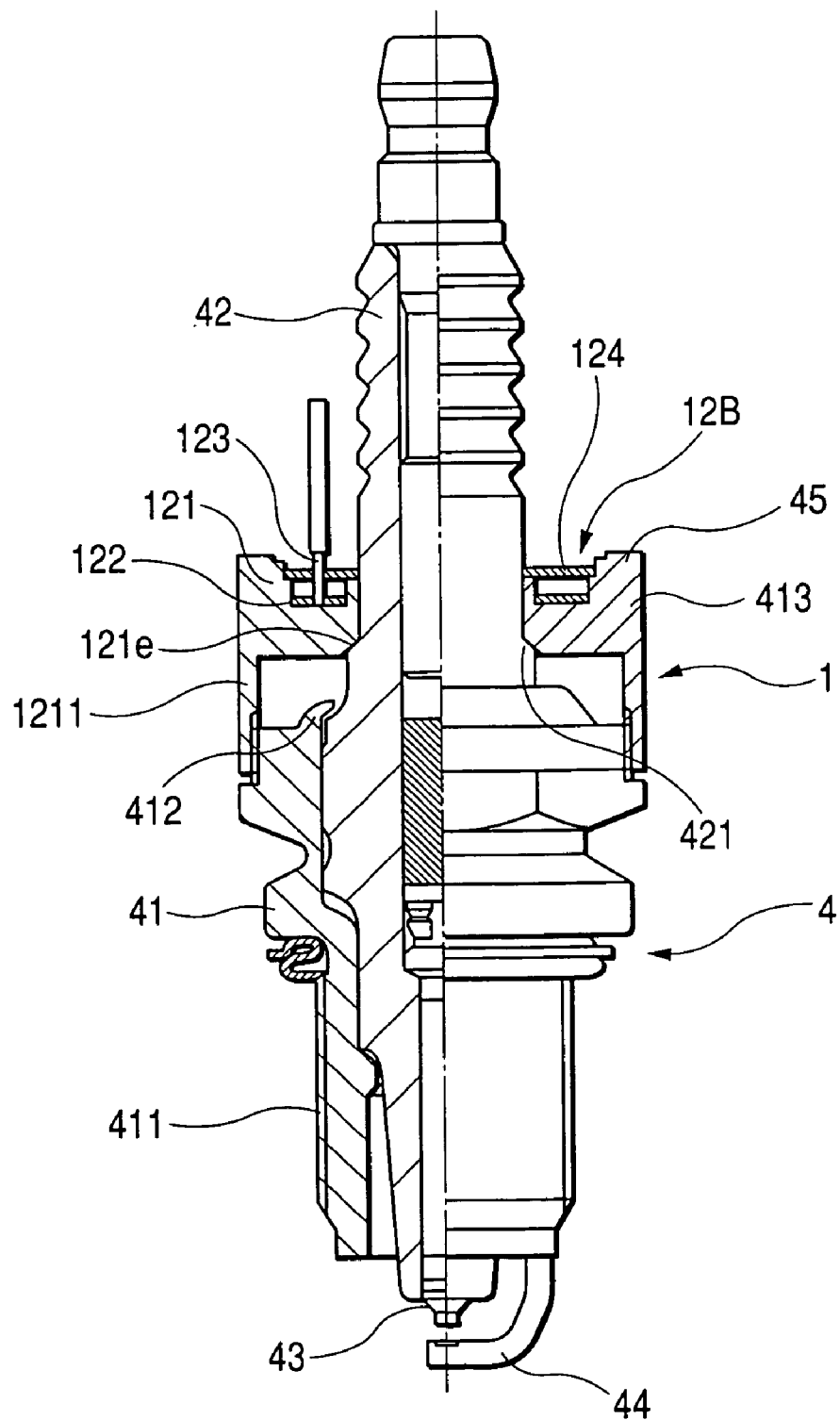
FIG. 8 is a longitudinal sectional view which shows a combustion pressure sensor according to the sixth embodiment of the invention which is mounted in a spark plug.

FIG. 8 shows the combustion pressure sensor 1 according to the sixth embodiment of the invention which is a modification of the fifth embodiment, as illustrated in FIG. 7. The combustion pressure sensor 1 of this embodiment is different in structure of the bendable member 121 of the load detector 12C from that of the fifth embodiment. The same reference numbers as employed in the fourth embodiment will refer to the same parts, and explanation thereof in detail will be omitted here.

The combustion pressure sensor 1 includes a cup-shaped casing 1211 which has the bendable member 121 formed integrally therewith. The casing 1211 is screwed on the metal shell 41 of the spark plug 4 to secure the load detector 12C on the metal shell 41.

The use of the casing 1211 facilitates ease of installation of the load detector 12C on the metal shell 41 and crimping of the annular protrusion 412 to hold the porcelain 42 within the shell 41 before the casing 1211 is installed on the metal shell 41.

Figure 9:
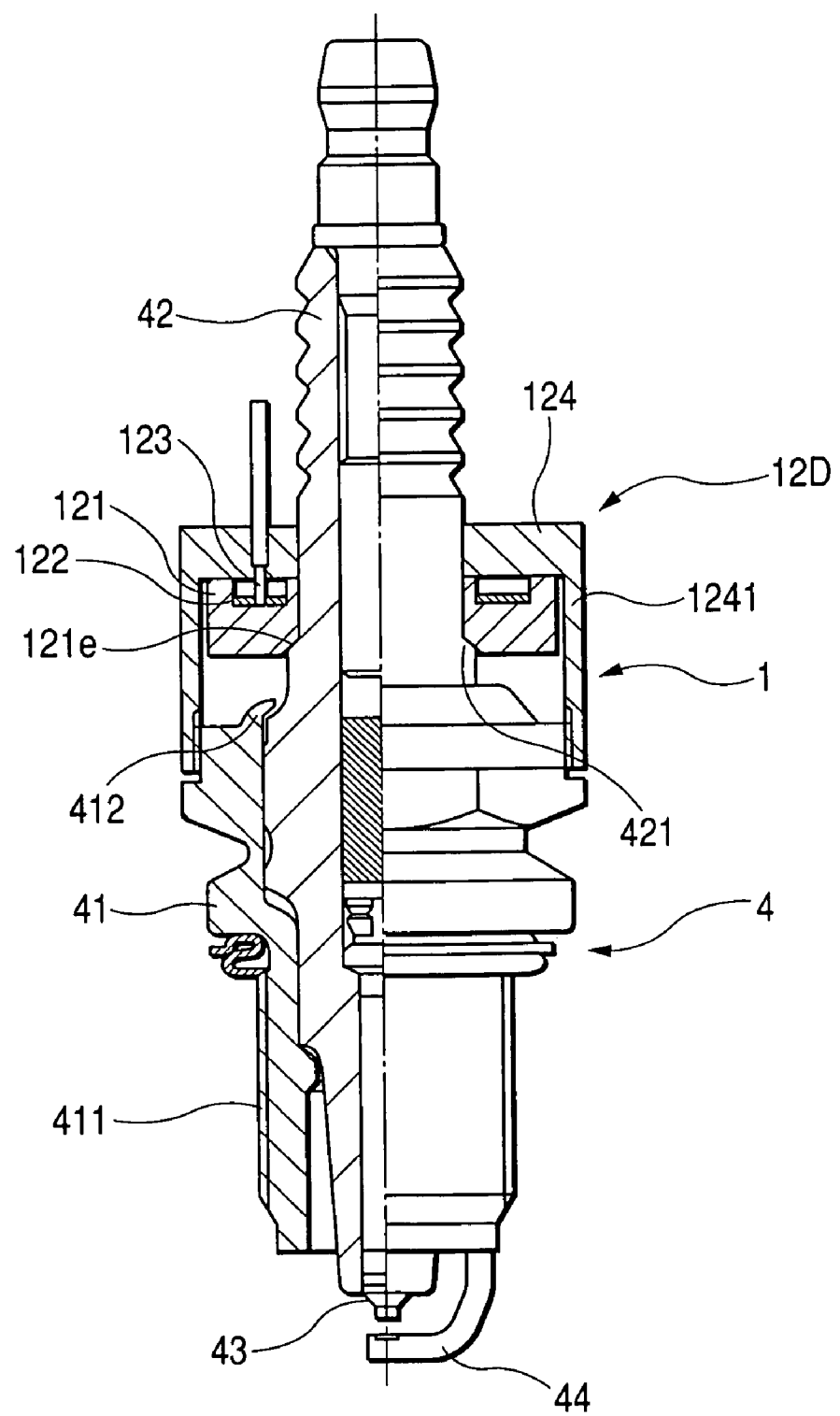
FIG. 9 is a longitudinal sectional view which shows a combustion pressure sensor according to the seventh embodiment of the invention which is mounted in a spark plug.

FIG. 9 shows the combustion pressure sensor 1 according to the seventh embodiment of the invention which is a modification of the fifth embodiment, as illustrated in FIG. 7. The combustion pressure sensor 1 of this embodiment is different in structure of the cover 124 from that of the fifth embodiment. The same reference numbers as employed in the fourth embodiment will refer to the same parts, and explanation thereof in detail will be omitted here.

The combustion pressure sensor 1 includes a cup-shaped casing 1241 which has the cover 124 formed integrally therewith. The cover 124 has the elastic member 122 affixed to an inner surface thereof. The casing 1241 is screwed on the metal shell 41 of the spark plug 4 to secure the load detector 12D on the metal shell 41.

The use of the casing 1241 facilitates ease of installation of the load detector 12D on the metal shell 41 and crimping of the annular protrusion 412 to hold the porcelain 42 within the shell 41 before the casing 1241 is installed on the metal shell 41.

A vibrational noise produced by the internal combustion engine is transmitted to the piezoelectric device 122 along a path extending from the metal shell 4 to the cover 124. The path is longer than those in the above embodiments, thus enhancing the attenuation of the noise. This improves the sensitivity of the combustion pressure sensor 1.

Figure 10:
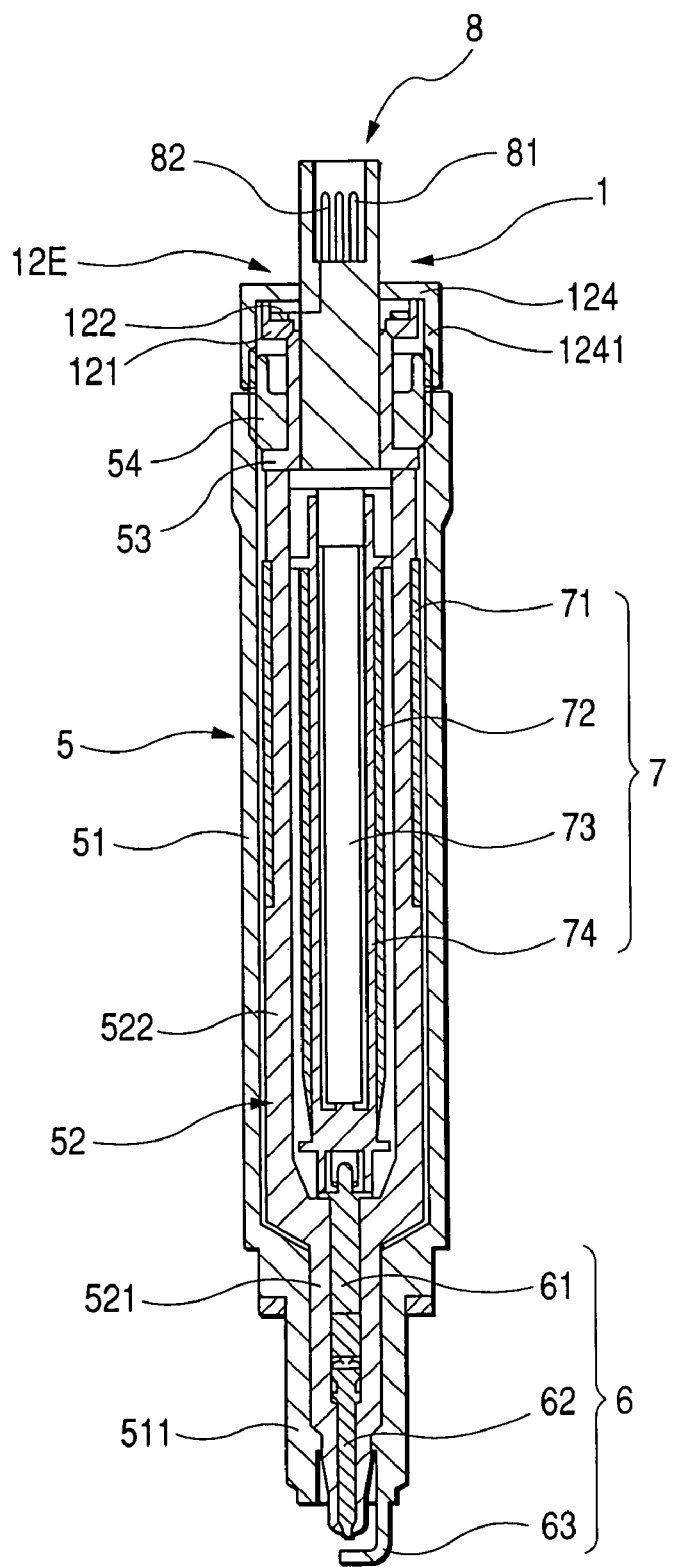
FIG. 10 is a longitudinal sectional view which shows a combustion pressure sensor according to the eighth embodiment of the invention which is mounted in an ignition device.

FIG. 10 shows the combustion pressure sensor 1 according to the eighth embodiment of the invention which is installed in an ignition device 5 equipped with a spark plug 6 and an ignition coil 7. The same reference numbers as employed in the first embodiment will refer to the same parts, and explanation thereof in detail will be omitted here.

The ignition device 5 includes a hollow cylindrical housing 51 made of a magnetic and conductive steel material. The housing 51 has the spark plug 6 and the ignition coil 7 installed therein. The combustion pressure sensor 1 is fitted within an open end of a base portion of the housing 51 which is remote from the combustion chamber. The housing 51 has an external thread 511 on the periphery of a top portion thereof which engages an internal thread of the cylinder head of the engine for installation of the ignition device 5 in the cylinder head with a spark gap exposed to the combustion chamber.

The housing 51 has installed therein a hollow cylindrical porcelain 52 made of alumina ceramic having excellent electric insulation ability. The porcelain 52 includes a plug side cylinder 521 to be placed within the combustion chamber and a coil side cylinder 522 extending from the plug side cylinder 521 away from the combustion chamber.

The spark plug 6 is made up of a conductive metal-made stem 61, a conductive metal-made center electrode 62, and a conducive metal-made ground electrode 63. The stem 61 and the center electrode 62 are fitted within a center hole in the plug side cylinder 521 of the porcelain 52. The center electrode 62 has a tip to be exposed to the combustion chamber. The ground electrode 63 is welded to the housing 51 and has a tip bent horizontally to create the spark gap between itself and the tip of the center electrode 62.

The ignition coil 7 is made up of a primary winding 71, a secondary winding 72, a cylindrical core 73, and a secondary spool 74 with a bottom. The cylindrical core 73 is made of a magnetic material. The secondary spool 74 is made of an electrically insulating resin.

The primary winding 71 is wound around a recess formed in an outer periphery of the coil side cylinder 522 of the porcelain 52. The primary winding 71 is connected at ends thereof to terminals 81 of a connector 8 for input of a control signal from an ignitor (not shown).

The secondary winding 72 is wound around the periphery of the secondary spool 74. The secondary spool 74 has formed therein a longitudinal center hole within which the core 73 is fitted. The secondary winding 72, the core 73, and the secondary spool 74 are disposed within a longitudinal center hole of the coil side cylinder 522.

The secondary winding 72 is joined at a high-voltage end thereof to the center electrode 62 of the spark plug 6 and at a low-voltage end thereof to the housing 51 through a terminal (not shown). The housing 51 is connected to ground through the cylinder head of the engine.

The combustion pressure sensor 1 also includes a hollow cylindrical piston 53 with a flange. The piston 53 is made of ceramic or metal and disposed on the end of the porcelain 52. A hollow cylindrical bolt 54 is screwed into an open end of the housing 51 to urge the flange of the piston 53 into constant abutment with the end of the porcelain 52, thereby retaining the piston 53 and the porcelain 52 within the housing 51. The porcelain 52 and the piston 53 work as a load transmitting member through which a physical load arising from the combustion of the engine is transmitted to the load detector 12E.

The load detector 12E has the bendable member 121 placed in engagement with the piston 53. Specifically, the bendable member 121 has an annular inner periphery urged into constant abutment with an outer periphery of a cylindrical portion of the bendable member 121. The bendable member 121 and the piezoelectric device 122 are disposed within the cover 124 formed as a part of the cup-shaped casing 1241 (see FIG. 10). The casing 1241 is screwed on the bolt 54 to secure the load detector 12E on the bolt 54 and also to apply a selected preload to the bendable member 121 to deform it.

The piezoelectric device 122 is connected at a signal output terminal thereof to a terminal 82 of the connector 8 for transmitting an output of the load detector 12E to an external controller (not shown).

The ignition device 5 is responsive to a control signal from the ignitor to develop a high voltage at the ignition coil 7. The spark plug 6 works to discharge the high voltage within the spark gap to ignite an air-fuel mixture within the combustion chamber of the engine. The pressure produced by the combustion in the combustion chamber is transmitted to the bendable member 121 of the load detector 12E through the porcelain 52 and the piston 53 to press the inner periphery of the bendable member 121. This causes the bendable member 121 to be bent or deformed, thus resulting in the stress on the piezoelectric device 122. The piezoelectric device 122 then outputs an electric signal as a function of the applied stress (i.e., the combustion pressure within the combustion chamber).

The combustion pressure sensor 1 of this embodiment produces the same beneficial effects as those in the first embodiment.

Figure 11:
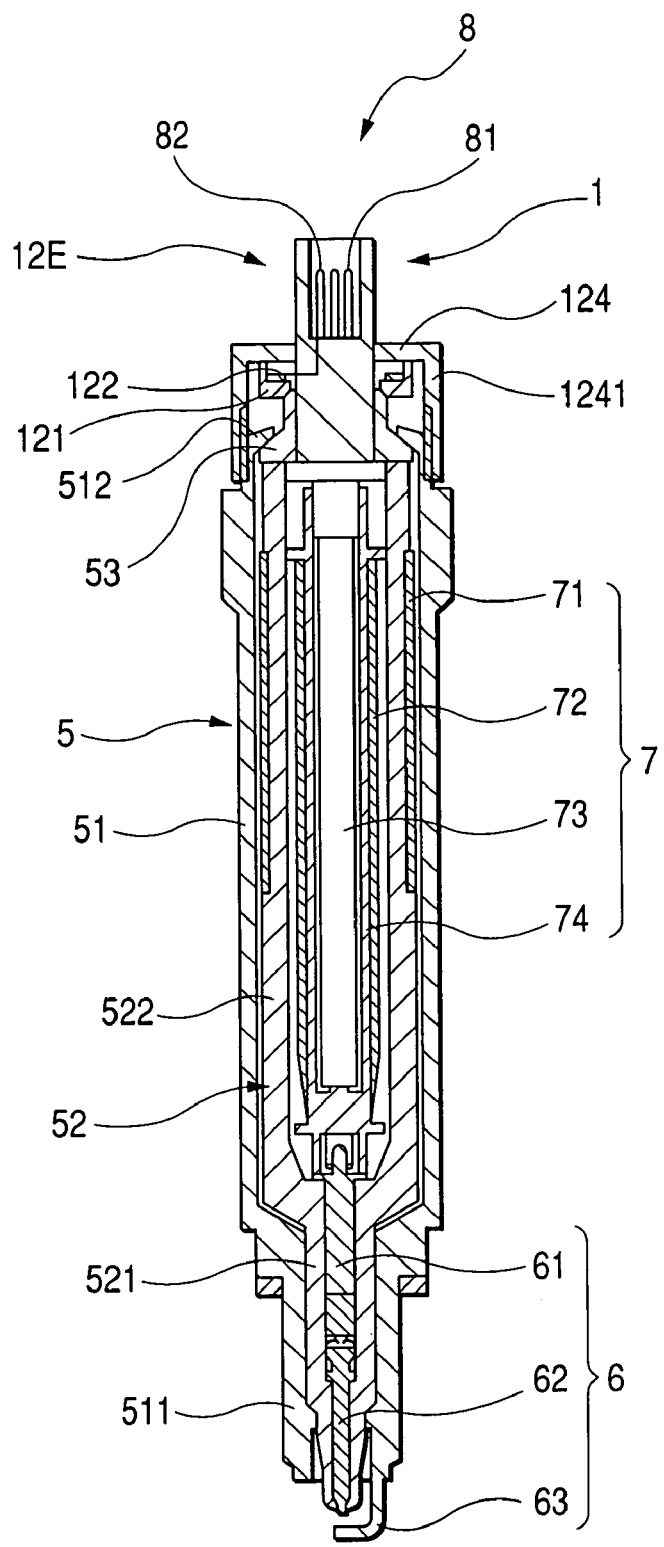
FIG. 11 is a longitudinal sectional view which shows a combustion pressure sensor according to the ninth embodiment of the invention which is mounted in an ignition device.

FIG. 11 shows the combustion pressure sensor 1 according to the ninth embodiment of the invention which is installed in the ignition device 5 equipped with the spark plug 6 and the ignition coil 7. This embodiment is different in installation of the porcelain 52 and the piston 53 from the eighth embodiment. The same reference numbers as employed in the eighth embodiment will refer to the same parts, and explanation thereof in detail will be omitted here.

The installation of the porcelain 52 and the piston 53 in the housing 51 is achieved by bending or crimping an annular extension 512 of the housing 51. The casing 1241 is screwed on the housing 51 to secure the load detector 12E on the housing 51 and also to apply a selected preload to the bendable member 121 to deform it. This structure eliminates the need for the bolt 54, as used in the eighth embodiment, thus permitting the length of the ignition device 5 to be decreased.

Figure 12:
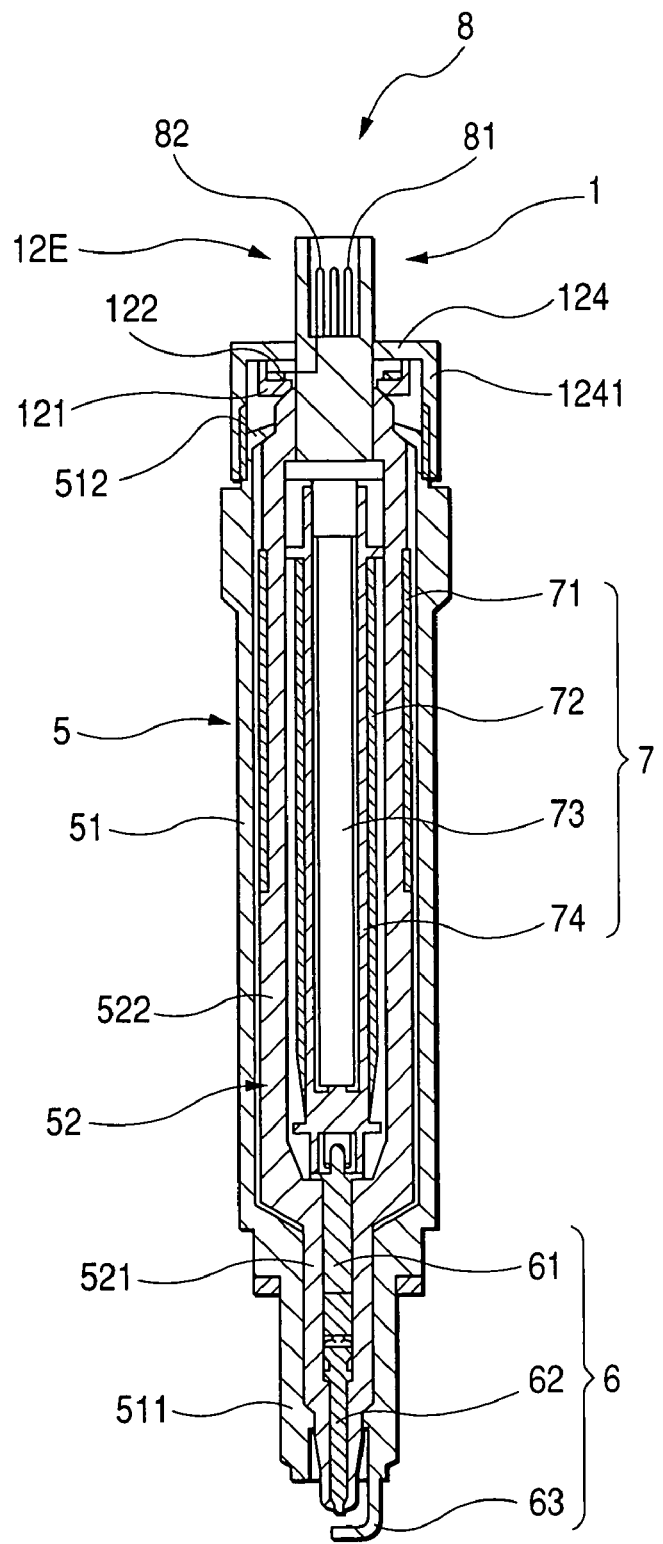
FIG. 12 is a longitudinal sectional view which shows a combustion pressure sensor according to the tenth embodiment of the invention which is mounted in an ignition device.

FIG. 12 shows the combustion pressure sensor 1 according to the tenth embodiment of the invention which is installed in the ignition device 5 equipped with the spark plug 6 and the ignition coil 7. This embodiment is different in structure of the porcelain 52 from the ninth embodiment. The same reference numbers as employed in the ninth embodiment will refer to the same parts, and explanation thereof in detail will be omitted here.

The porcelain 52 has formed integrally therewith the piston 53, as used in the ninth embodiment. The porcelain 52 works as a load transmitting member through which a physical pressure load created by the combustion in the combustion chamber is transmitted to the load detector 12E. Specifically, the pressure load is transmitted to the bendable member 121 of the load detector 12E only through the porcelain 52, thus improving the sensitivity of the load detector 12E.

Figure 13:
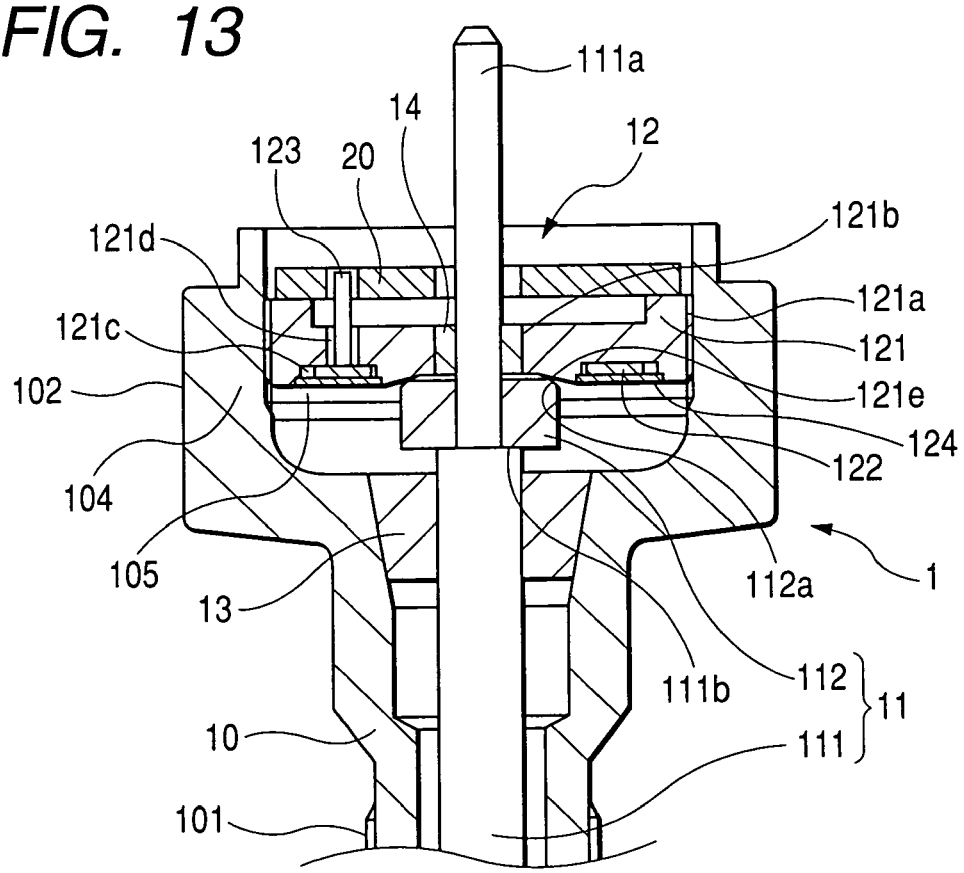
FIG. 13 is a partially enlarged view which shows a signal processing circuit mounted in a combustion pressure sensor.
Figure 14:
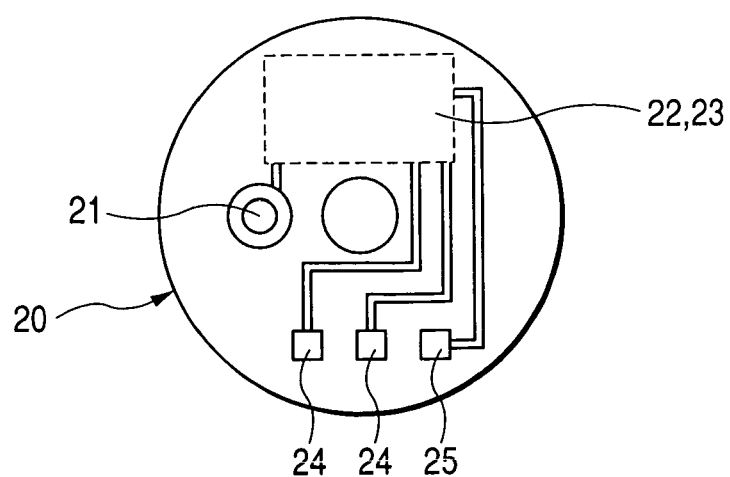
FIG. 14 is a plane view which shows the signal processing circuit in FIG. 13.

FIGS. 13 and 14 show a signal processor fabricated on a circuit substrate 20 which works to convert charges produced by the piezoelectric device 122 into an electric voltage and control the level of the voltage. The signal processor, as discussed blow, may be used in the load detector of any of the above described first to tenth embodiments.

The circuit substrate 20 is of a circular shape and bonded to the upper surface of the bendable member 121. The circuit substrate 20 has a terminal joint 21, a voltage converter 22, and a voltage adjuster 23 mounted thereon. The terminal joint 21 is electrically connected, e.g., soldered to the output terminal 123 leading to the piezoelectric device 122. The voltage converter 22 works to convert charges produced by the piezoelectric device 122 into a voltage signal. The voltage adjuster 23 works to adjust the level or gain of the voltage signal to a desired one.

Figure 15:
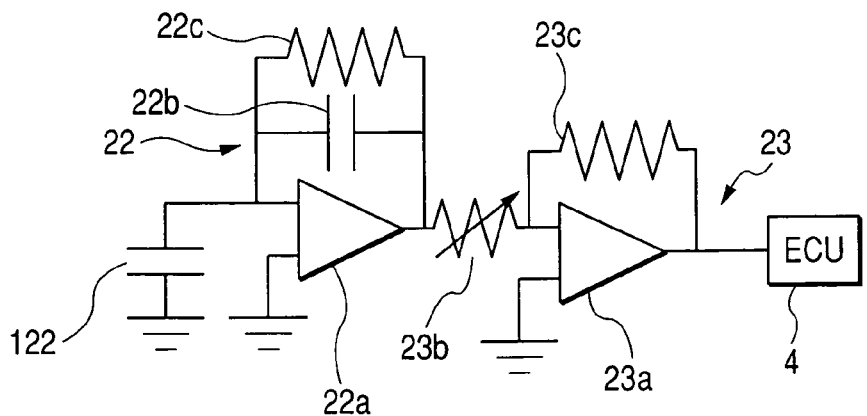
FIG. 15 is a circuit diagram which shows a structure of the signal processing circuit in FIG. 13.

The voltage converter 22 is, as clearly shown in FIG. 15, made up of an operational amplifier 22a, a capacitor 22b, and a resistor 22c and works to provide a voltage proportional to a charge developed by the piezoelectric device 122. The voltage adjuster 23 is made up of an operational amplifier 23a, a regulating resistor 23b, and a fixed resistor 23c. The resistance value of the regulating resistor 23b is, as described later in detail, regulated to a selected one.

The operational amplifiers 22a and 23a are supplied with electric power from power supply lands 24, as illustrated in FIG. 14. The output of the voltage adjuster 23 is transmitted as a sensor output of the combustion pressure sensor 1 to an engine ECU 4 through an output land 65.

Adjustment of a gain of the voltage adjuster 23 by means of modification of the resistance value of the regulating resistor 23b will be described below with reference to FIG. 16.

Figure 16:
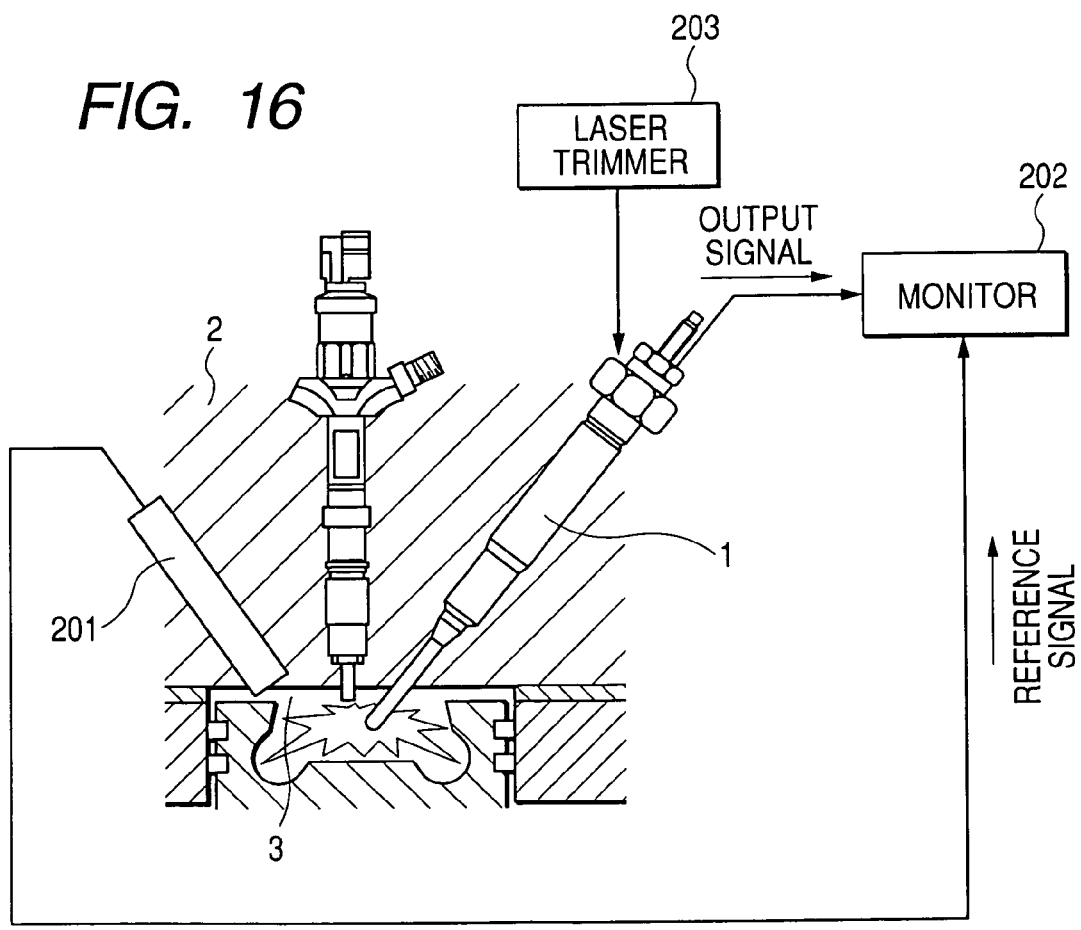
FIG. 16 is an explanatory view which shows how to adjust a circuit constant of the signal processing circuit in FIG. 13.

The internal combustion engine, as illustrated in FIG. 16, is used in adjusting the gain of the voltage adjuster 23. A pressure sensor 201 is installed in the cylinder head 2 of the engine which produces an electric signal as a function of pressure within the combustion chamber 3.

The combustion pressure sensor 1 is installed in the engine. The engine is run to apply the combustion pressure to the pressure sensor 201 and the combustion pressure sensor 1. Outputs of the pressure sensor 201 and the combustion pressure sensor 1 are indicated on a monitor 202. The output of the pressure sensor 201 is used as a reference voltage signal to adjust the voltage level of the output of the combustion pressure sensor 1 to a desired one matching the reference voltage signal. Specifically, such adjustment is achieved by trimming the regulating resistor 23b using a laser trimmer 203 to change a circuit constant of the voltage adjuster 23 until the output of the combustion pressure sensor 1 reaches a desired one. This permits a unit-to-unit variation in performance of the combustion pressure sensor 1 to be minimized, which results in increased accuracy of the engine control and decreased production costs of the system.

The voltage converter 22, as described above, works to convert an output of the piezoelectric device 122 into a voltage signal insensitive to electric noises, thus resulting in an improved S/N ratio of the signal inputted to the ECU 4.

Figure 17:
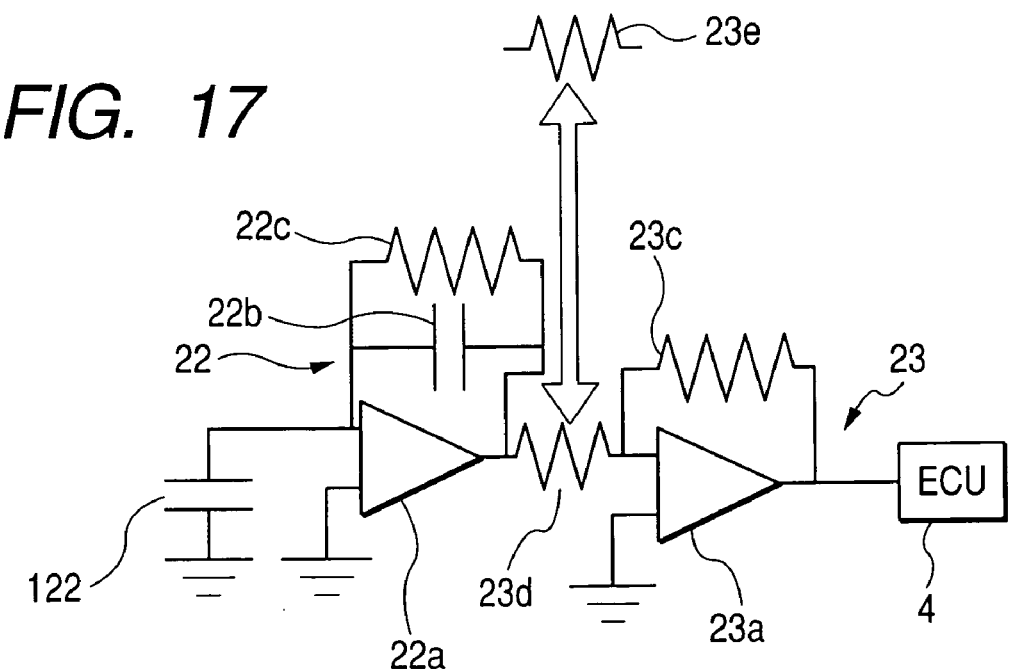
FIG. 17 is a circuit diagram which shows the first modification of the signal processing circuit in FIG. 13.

FIG. 17 shows the first modification of the signal processor fabricated on the circuit substrate 20 which is different from the one, as illustrated in FIGS. 15 and 16, in the adjustment of the gain of an output of the combustion pressure sensor 1. The same reference numbers as employed in FIG. 15 will refer to the same parts, and explanation thereof in detail will be omitted here.

The voltage adjuster 23 consists of the operational amplifier 23a, the fixed resistor 23c, and a dummy resistor 23d. The adjustment of the gain of the output of the combustion pressure sensor 1 is, as will be described below in detail, achieved by monitoring the gain of the voltage adjuster 23 equipped with the dummy resistor 23d and replacing the dummy resistor 23d with a selected resistor 23e which works to provide a desired gain of the voltage adjuster 23.

Specifically, the combustion pressure sensor 1 is installed in the engine, as illustrated in FIG. 16. The engine is run to apply the combustion pressure to the pressure sensor 201 and the combustion pressure sensor 1. Outputs of the pressure sensor 201 and the combustion pressure sensor 1 are monitored through the monitor 202. The output of the pressure sensor 201 is used as a reference voltage signal to adjust the voltage level of the output of the combustion pressure sensor 1 (i.e., the voltage adjuster 23) to a desired one. One of predefined relations between the output of the voltage adjuster 23 and the reference voltage signal, as listed on a map, is picked up which agrees with a relation between an actual output of the voltage adjuster 23 equipped with the dummy resistor 23d and the reference voltage signal. One of resistors having different resistance values which is required to match the output of the voltage adjuster 23 with the reference voltage signal is selected as the resistor 23e based on the picked up relation. Finally, the the dummy resistor 23d is replaced with the selected resistor 23e.

Figure 18:
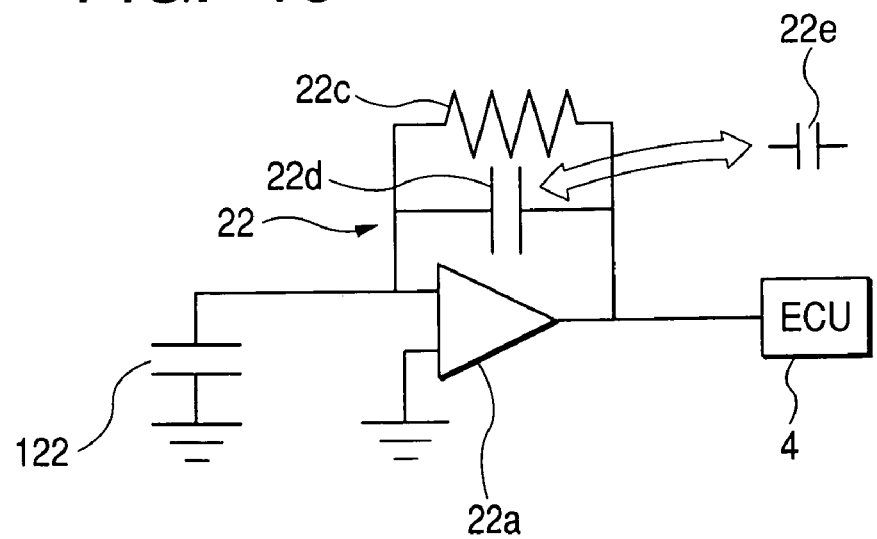
FIG. 18 is a circuit diagram which shows the second modification of the signal processing circuit in FIG. 13.

FIG. 18 shows the second modification of the signal processor fabricated on the circuit substrate 20 which is different from the one, as illustrated in FIGS. 15 and 16, in the adjustment of the gain of an output of the combustion pressure sensor 1. The same reference numbers as employed in FIG. 15 will refer to the same parts, and explanation thereof in detail will be omitted here.

The voltage converter 22 consists of the operational amplifier 22a, the resistor 22c, and a dummy capacitor 22d. The adjustment of the gain of the output of the combustion pressure sensor 1 is, as will be described below in detail, achieved by monitoring the gain of the voltage converter 22 equipped with the dummy capacitor 22d and replacing the dummy capacitor 22d with a selected capacitor 22e which works to provide a desired gain of the voltage converter 22.

Specifically, the combustion pressure sensor 1 is installed in the engine, as illustrated in FIG. 16. The engine is run to apply the combustion pressure to the pressure sensor 201 and the combustion pressure sensor 1. Outputs of the pressure sensor 201 and the combustion pressure sensor 1 are monitored through the monitor 202. The output of the pressure sensor 201 is used as a reference voltage signal to adjust the voltage level of the output of the combustion pressure sensor 1 (i.e., the voltage converter 22) to a desired one. One of predefined relations between the output of the voltage converter 22 and the reference voltage signal, as listed on a map, is picked up which agrees with a relation between an actual output of the voltage converter 22 equipped with the dummy capacitor 22d and the reference voltage signal. One of capacitors having different capacitances which is required to match the output of the voltage converter 22 with the reference voltage signal is selected as the capacitor 22e based on the picked up relation. Finally, the dummy capacitor 22d is replaced with the selected capacitor 22e.

The gain adjustment in this embodiment is, as described above, made in the voltage converter 22, thus eliminating the need for the voltage adjuster 23.

The gain adjustment may alternatively be achieved by applying hydraulic or air pressure equivalent to the combustion pressure within the combustion chamber 3 directly to the pressure sensor 201 and the combustion pressure sensor 1 without use of the engine.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For example, the piezoelectric device 122 may be replaced with a strain gauge(s).

What is claimed is:

1. A combustion pressure sensor for an internal combustion engine comprising:
    a sensing element sensitive to a physical load applied thereto to produce a signal as a function of the applied load; and
    a bendable member placed in abutment with said sensing element, said bendable member being bent upon application of a combustion pressure in an internal combustion engine to apply the physical load to said sensing element,
    wherein the bendable member has a hole formed through a center thereof for receiving a load transmitting member and also has a tapered wall formed thereon for making a line-to-line contact with a contact member of the load transmitting member.

2. A combustion pressure sensor as set forth in claim 1, wherein said sensing element and said bendable member are disposed within a spark plug equipped with a center electrode and a ground electrode which defines a spark gap between itself and the center electrode for producing sparks to ignite a mixture in the internal combustion engine.

3. A combustion pressure sensor as set forth in claim 1, wherein said sensing element is a piezoelectric device.

4. A combustion pressure sensor as set forth in claim 1, wherein said sensing element is a strain gauge.

5. A combustion pressure sensor as set forth in claim 1, wherein said sensing element is a piezoelectric device which produces a charge as a function of the physical load applied thereto, and further comprising a voltage converter working to convert the charge produced by the piezoelectric device into a voltage signal.

6. A combustion pressure sensor as set forth in claim 5, further comprising a voltage adjuster working to adjust a level of the voltage signal provided by said voltage converter.

7. A combustion pressure sensor as set forth in claim 5, further comprising a heating member which is supplied with an electric power to heat air within the combustion chamber of the engine.

8. A combustion pressure sensor for an internal combustion engine comprising:
    a hollow cylindrical housing having a length, said housing being designed to have a combustion chamber side end facing a combustion chamber of an internal combustion engine;
    a load detector including a bendable member and a sensing element, the bendable member being subjected to a bend deformation upon application of a physical load applied thereto, the sensing element being placed in abutment with the bendable member so as to undergo a bend deformation following the bend deformation of the bendable member to produce a signal as a function of the physical load applied to the bendable member; and
    a load transmitting member disposed within said housing, said load transmitting member having a length with an end portion extending outside the combustion chamber side end of said housing, said load transmitting member working to transmit a combustion pressure within the combustion chamber of the engine to the bendable member of said load detector as the physical load,
    wherein the bendable member has formed in a center thereof a hole through which said load transmitting member passes and also has a tapered wall formed thereon, wherein said load transmitting member includes a contact member having a rounded surface which makes a line-to-line contact with the tapered wall of said bendable member.

9. A combustion pressure sensor as set forth in claim 8, wherein the bendable member is a plate which includes an inner and an outer portion, the outer portion having a periphery secured on said housing, the inner portion being applied with the physical load transmitted through said load transmitting member, and wherein the sensing element is disposed between the outer and inner portions of the bendable member.

10. A combustion pressure sensor as set forth in claim 8, wherein the bendable member has a chamber within which the sensing element is disposed, and wherein said load detector also includes a metallic cover joined to the bendable member to hermetically seal the chamber.

11. A combustion pressure sensor as set forth in claim 8, wherein said load transmitting member has installed therein a heating element which is supplied with an electric power to produce heat.

12. A combustion pressure sensor as set forth in claim 8, wherein said sensing element and said bendable member are disposed within a spark plug equipped with a center electrode and a ground electrode which defines a spark gap between itself and the center electrode for producing sparks to ignite a mixture in the internal combustion engine.

13. A combustion pressure sensor as set forth in claim 8, wherein said sensing element is a piezoelectric device.

14. A combustion pressure sensor as set forth in claim 8, wherein said sensing element is a strain gauge.

* * * * *